(12) United States Patent
Danieli

(10) Patent No.: US 8,340,828 B2
(45) Date of Patent: Dec. 25, 2012

(54) WATER AND FERTILIZER MANAGEMENT SYSTEM

(76) Inventor: Nissim Danieli, Yokneam (IL)

( * ) Notice: Subject to any disclaimer, the term of this patent is extended or adjusted under 35 U.S.C. 154(b) by 70 days.

(21) Appl. No.: 12/741,343

(22) PCT Filed: Jun. 4, 2008

(86) PCT No.: PCT/IL2008/000764
§ 371 (c)(1),
(2), (4) Date: Sep. 8, 2010

(87) PCT Pub. No.: WO2008/149361
PCT Pub. Date: Dec. 11, 2008

(65) Prior Publication Data
US 2010/0332039 A1    Dec. 30, 2010

(51) Int. Cl.
*G05D 11/00* (2006.01)
(52) U.S. Cl. ........................ 700/284
(58) Field of Classification Search ............ 700/284
See application file for complete search history.

(56) References Cited

U.S. PATENT DOCUMENTS

| | | | |
|---|---|---|---|
| 3,553,481 A * | 1/1971 | Hasenbeck | 307/118 |
| 3,961,753 A * | 6/1976 | Sears | 239/64 |
| 4,567,563 A * | 1/1986 | Hirsch | 700/284 |
| 4,892,113 A | 1/1990 | Fattahi | |
| 5,418,466 A * | 5/1995 | Watson et al. | 324/668 |
| 5,621,669 A * | 4/1997 | Bjornsson | 702/85 |
| 6,874,707 B2 | 4/2005 | Skinner | |
| 6,947,810 B2 | 9/2005 | Skinner | |
| 6,986,281 B1 * | 1/2006 | Hubbell et al. | 73/152.01 |
| 7,042,234 B2 * | 5/2006 | Buss | 324/664 |
| 7,069,692 B2 | 7/2006 | Kuiper et al. | |
| 7,927,883 B2 * | 4/2011 | Tuli et al. | 436/110 |
| 2006/0000267 A1 * | 1/2006 | Hubbell et al. | 73/152.01 |
| 2006/0178847 A1 | 8/2006 | Glancy et al. | |
| 2006/0254371 A1 * | 11/2006 | Shiloni et al. | 73/864.34 |
| 2007/0039745 A1 * | 2/2007 | Anderson et al. | 172/6 |
| 2007/0220808 A1 | 9/2007 | Kaprielian et al. | |
| 2007/0260400 A1 * | 11/2007 | Morag et al. | 702/1 |
| 2008/0000840 A1 * | 1/2008 | Zupancic | 210/742 |
| 2010/0263436 A1 * | 10/2010 | Caron et al. | 73/38 |

FOREIGN PATENT DOCUMENTS

| | | |
|---|---|---|
| WO | 02096189 A2 | 12/2002 |
| WO | 2004071162 A2 | 8/2004 |
| WO | 2005/026053 A2 | 3/2005 |
| WO | 2006/096054 A1 | 9/2006 |

* cited by examiner

*Primary Examiner* — Ronald Hartman, Jr.
(74) *Attorney, Agent, or Firm* — Browdy and Neimark, P.L.L.C.

(57) ABSTRACT

A monitoring system is provided for monitoring the growing conditions of plants in the vicinity of the roots. In addition, it is provided a system that applies real-time analysis of the growing process parameters and takes into consideration components such as plant, soil, climate, fertilizer and water. A management system based on the real-time analysis is designed that computes the amount of water and fertilizer needed every day to the plants.

7 Claims, 6 Drawing Sheets

WATER AND FERTILIZER MANAGEMENT SYSTEM

FIELD OF THE INVENTION

The present invention relates to irrigation control systems. More particularly, the present invention relates to automatic real-time water and fertilizer management system.

BACKGROUND OF THE INVENTION

Nowadays irrigation methods use generic tables and charts in order to determine the amounts of water and fertilizer that should be used for irrigation. These tables and charts are served as a generic tool and were generated as "one size fit all" solution. They do not provide the grower with any direct analysis presentation that fit individual needs of his own crop in terms of water and fertilizer applications at a given point in time.

Generic methods define growing process parameters, such as the amount of water and fertilizers needed for different types of crops and soil. Current static implementations use only initial once time parameters' values to define the irrigation and fertilization policy for growing different types of crops in different land and weather conditions. Such one time values definition and policy making is not optimal and results in having harvests with lower yields and lower qualities than what the plant and filed is actual capable of producing.

There is a long felt need to provide a method for irrigation and fertilization that is based on the immediate actual needs of the plants at any time, place, and weather, rather than generating one time decision.

SUMMARY OF THE INVENTION

It is an object of the present invention to provide a monitoring system for monitoring the growing conditions of plants in the vicinity of the root.

It is another object of the present invention to provide a system that applies real-time analysis of the growing process parameters and takes into consideration components such as plant, soil, climate, fertilizer and water.

It is yet another object of the present invention to provide a management system based on the real-time analysis, the system computes the amount of water and fertilizer needed every day to the plants.

It is therefore provided in accordance with a preferred embodiment of the present invention A field monitoring unit capable of sensing parameters related to conditions in the soil in the vicinity of a root zone, the field monitoring unit comprises at least one sensor adapted to directly sense the parameters and to transfer data to a database.

Furthermore in accordance with another preferred embodiment of the present invention, said field monitoring unit comprises a tensiometer capable of measuring changes in the water potential in the root vicinity.

Furthermore in accordance with another preferred embodiment of the present invention, the system further comprises:
  a pump capable of sucking solution from the soil in the vicinity of a root zone;
  container adapted to receive said solution;
  at least one sensor capable of sensing parameters of said solution wherein measured values are transferred to database.

Furthermore in accordance with another preferred embodiment of the present invention, one of said at least one sensor is a pH sensor.

Furthermore in accordance with another preferred embodiment of the present invention, one of said at least one sensor is a nitrate sensor.

Furthermore in accordance with another preferred embodiment of the present invention, one of said at least one sensor is an electrical conductivity sensor.

It is further provided in accordance with another preferred embodiment of the present invention, a water and fertilizer management system that comprises:
  at least one field monitoring unit, wherein each one of said at least one field monitoring unit comprises at least one sensor adapted to directly sense parameters related to soil;
  communication system capable of receiving the parameters from said at least one field monitoring unit;
  a controller unit capable of activating irrigation and fertilizing systems in accordance with parameters related to soil that are received from said at least one field monitoring unit.

Furthermore in accordance with another preferred embodiment of the present invention, the system further comprises a computer adapted to establish a database from the parameters related to soil and to process the database. so as to transfer information to said controller unit, wherein said controller unit activates said irrigation and fertilizing systems in accordance with said database.

Furthermore in accordance with another preferred embodiment of the present invention, said monitoring unit comprises a tensiometer capable of measuring changes in the water potential in the root vicinity.

Furthermore in accordance with another preferred embodiment of the present invention, wherein one of said at least one sensor is a pH sensor.

Furthermore in accordance with another preferred embodiment of the present invention, wherein one of said at least one sensor is a nitrate sensor.

Furthermore in accordance with another preferred embodiment of the present invention, wherein one of said at least one sensor is an electrical conductivity sensor. Furthermore in accordance with another preferred embodiment of the present invention, wherein said communication system communicated through a computer net.

Furthermore in accordance with another preferred embodiment of the present invention, wherein said communication system is cellular.

In addition, a method for managing water and fertilizer system is provided in accordance with another preferred embodiment of the present invention, said method comprises:
  positioning at least one field monitoring unit in soil in the vicinity of a root zone, said at least one field monitoring unit is capable of sensing parameters related to conditions in the soil, wherein said at least one field monitoring unit comprises at least one sensor;
  transferring the parameters to a processor so as to establish a database;
  providing a controller capable of activating the water and fertilizing system in accordance to the parameters in the database.

Furthermore in accordance another preferred embodiment of the present inventory wherein providing information in accordance to the parameters involves:
  model growing data presenting desired parameters' values for optimal grows for different crops;
  a sub-method to compare the sensed data with the model and establishing desired amount of water and fertilizing needed and values to set up the controller.

Furthermore in accordance with another preferred embodiment of the present invention, wherein said monitoring unit comprises a tensiometer capable of measuring changes in the water potential in the vicinity of the root.

Furthermore in accordance with another preferred embodiment of the present invention, wherein one of said at least one sensor is a pH sensor.

Furthermore in accordance with another preferred embodiment of the present invention, wherein one of said at least one sensor is a nitrate sensor.

Furthermore in accordance with another preferred embodiment of the present invention, wherein one of said at least one sensor is an electrical conductivity sensor.

Furthermore in accordance with another preferred embodiment of the present invention, wherein data is transferred to the model from multiple users.

BRIEF DESCRIPTION OF THE FIGURES

In order to better understand the present invention and appreciate its practical applications, the following Figures are attached and references herein. Like components are denoted by like reference numerals.

It should be noted that the figures are given as examples and preferred embodiments only and in no way limit the scope of the present invention as defined in the appending Description and Claims.

DETAILED DESCRIPTION OF THE FIGURES

The four most important parameters in crop growing, independent of substrate are:
1. Quantity of water allocated to irrigation.
2. Duration and point in time of irrigation.
3. Quantity of fertilizers.
4. Duration of time allocated for fertilization.

In most cases the answer to these questions is found in tables that contain permanent and pre determined data for different conditions but they are not pertaining to quality of soil and crop that are changed during the growing process; at the same time, the actual parameters' values that change over time are easily checked by the grower. Automatic and outright use of these tables brought about an exaggerated use of water and fertilizers, and as a consequence irreparable damage to crops and soil in addition to growing cost raise.

The water and fertilizer management system of the present invention gives real-time answers to the four questions by using scientific analysis of the conditions in the field and comparing to the required parameters' values.

Reference is now made to the figures.

Figure 1:
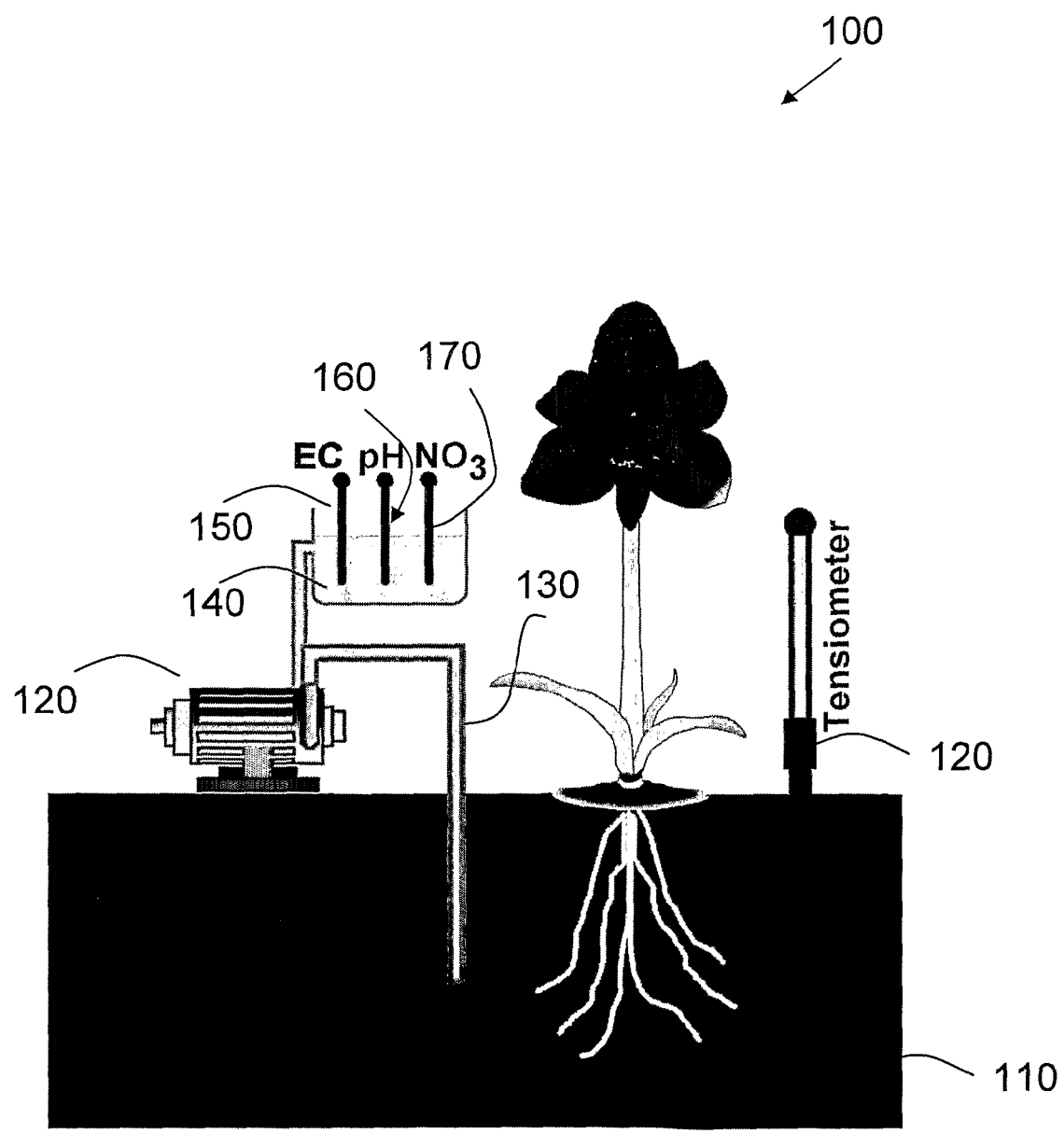
FIG. 1 illustrates a water and fertilizer management system in accordance with a preferred embodiment of the present invention, incorporating field monitoring unit.

FIG. 1 illustrating field-monitoring unit 100 in accordance with a preferred embodiment of the present invention. Preferably four parameters are being measured in the vicinity of the plant's root zone 110 so as to establish current data to be stored in a control database. The means required for establishing the control database comprises at least one field-monitoring unit provided with sensors. A field monitoring unit comprises a tensiometer 120. Tensiometer 120 measures changes in the water potential around the root zone 110, in exactly the same way the roots do when they are battling for water. When water from the soil is diminishing, the vacuum level inside the tentiometer increases, thus indicating the need for irrigation.

A preferred tensiometer known to work in low and small water potential variation is the mercury type. This tensiometer's mechanism is based on the barometer principle, hence no mechanical parts are involved and therefore it gives very precise and accurate readings with a very long lasting accuracy. The readings are given in negative centibars, i.e. higher readings correspond to higher water potential and thus less availability of water.

The field monitoring unit comprises a soil suction tube 130 operated by a pump 120; the suction tube is a device that permits the user to sample the actual soil solution from root zone 110, in order to analyze its contents further on. This way of directly sampling simulates the roots. If sampling is performed at a certain known period, the results can safely be related to the situation at the plant's root during that time period.

The water are sucked from the soil by pump 120 through suction tube 130 and are collected in container 140 that acts as a mini laboratory consisting of various test kits. In the preferred embodiment given herein, electric conductivity (EC) 150, pH 160, and nitrates 170 are measured. The main characteristics of assembling these kits are: (1) they are fairly accurate and reliable, (2) they are easy to operate in the field in real time and the results do not take long time to obtain, and (3) they are low cost devices.

Figure 2:
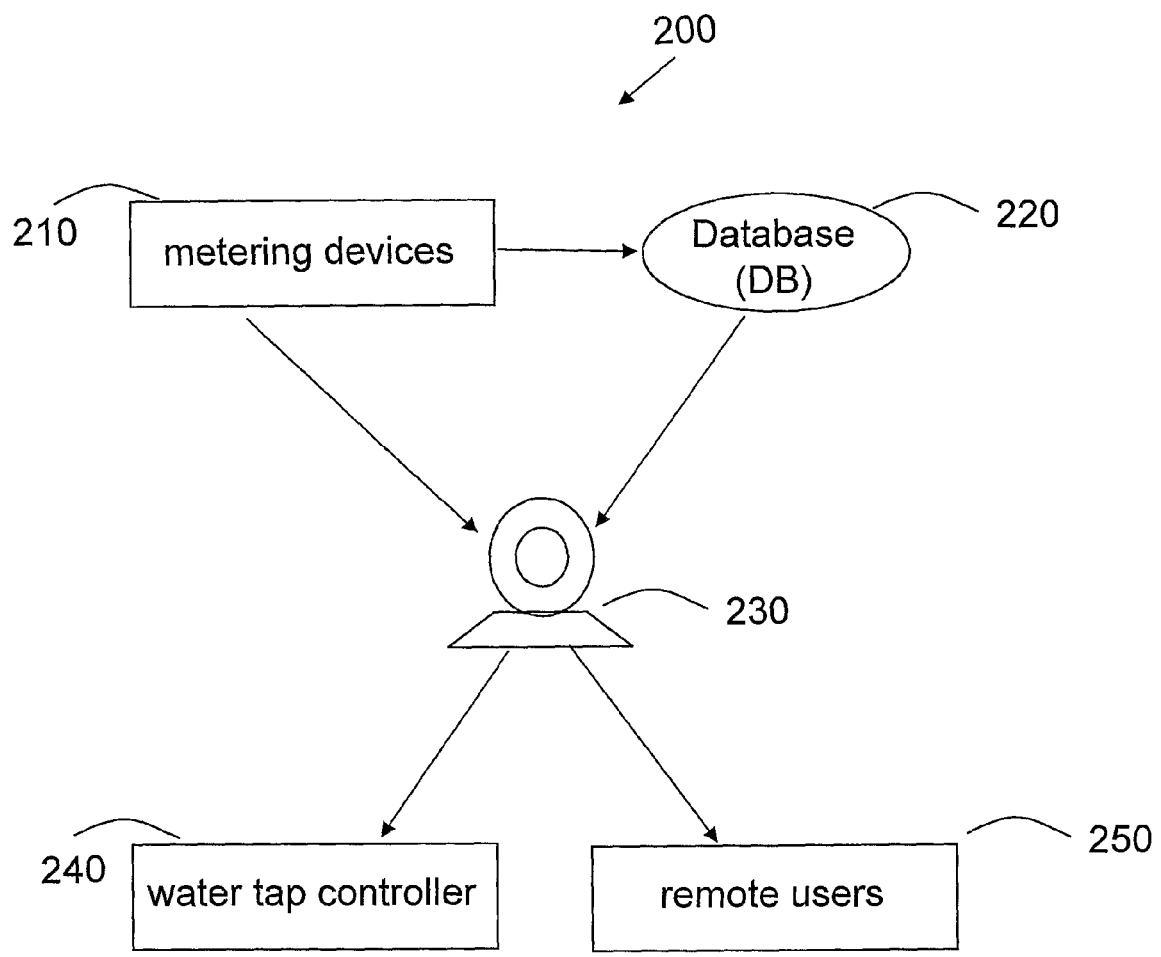
FIG. 2 illustrates field monitoring unit in accordance with a preferred embodiment of the present invention.
Figure 3:
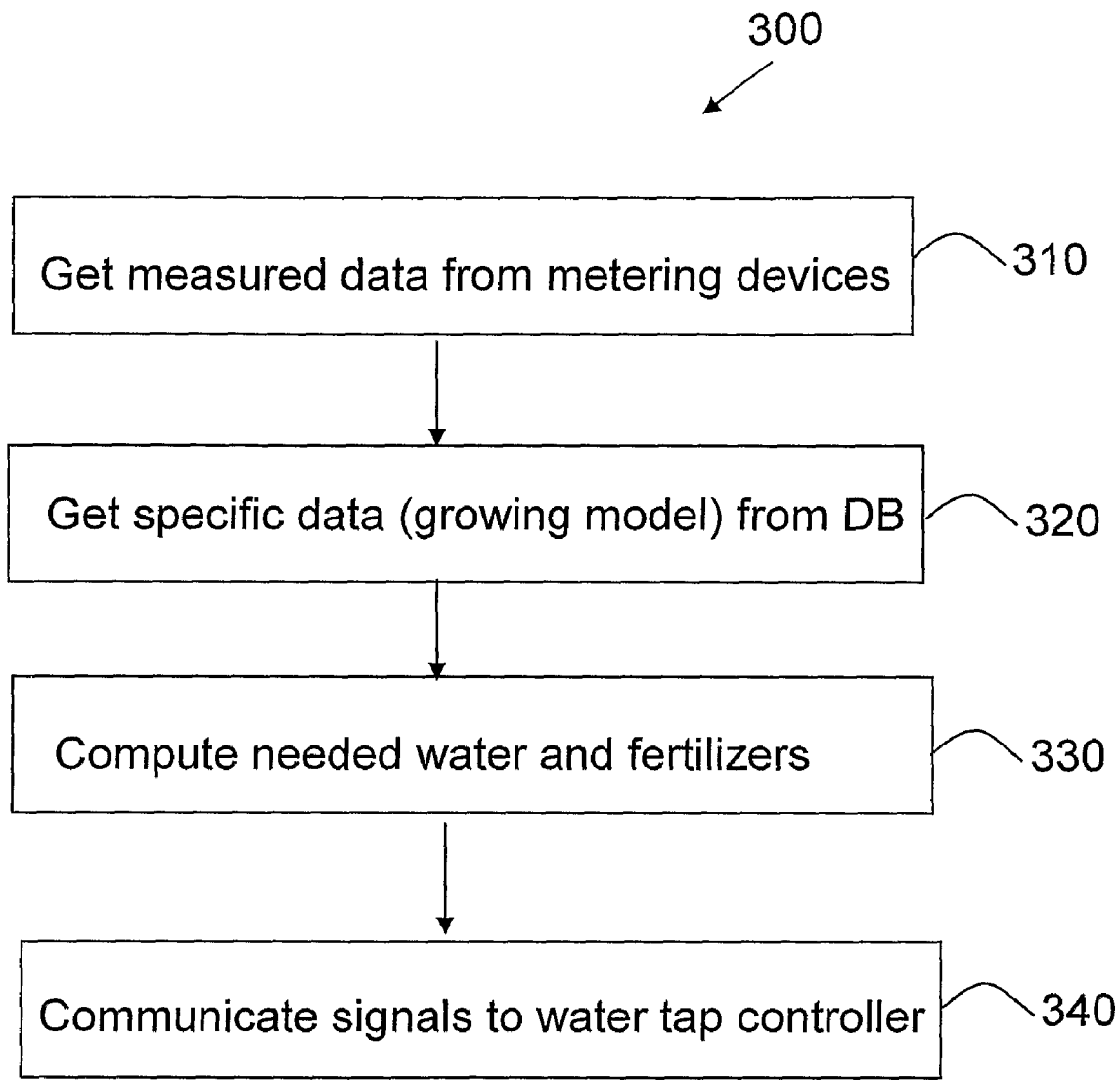
FIG. 3 illustrates a process in the water and fertilizer management system in accordance with a preferred embodiment of the present invention.

There are automatic and manual ways to utilize such system; automatic process is illustrated in FIGS. 2, and 3 in accordance with a preferred embodiment of the present invention.

A manual operation scheme is generally as follows:
1. At a pre-set frequency, data is collected from the field monitoring unit and the soil solution samples are analyzed.
2. Data is recorded on a form, in a way that permits later analysis.
3. At a pre-set frequency, a leaf sample is collected and analyzed in the laboratory in order to obtain a chemical composition.
4. At the pre-set frequency, data set are analyzed and decisions are made as to what measures are to be taken in order to attend to the plant's needs.

Reference is now made to FIG. 2 illustrating water and fertilizer management system 200 in accordance with a preferred embodiment of the present invention. The system is comprised with metering device 210 which is a field monitoring unit 100 that collects current parameter's values of the soil around the root of a planet and analyzes it; sampled and analyzed data is communicated to data database 220 of the management system and system's server 230; database 220 is used for collecting data, by various communication means known in the art, sample data, analyzed data, generic pre-defined data of agricultural knowledge, and data gathered by many growers. The data includes all the control parameters: climate control (temp, humidity) and water/soil control.

Additionally, the database includes many various agricultural information data. System server 230 uses data from database 220 and current data from metering device 210 to generate irrigation and fertilizing policy as well as signals for operating water & soil system controller 240 that controls the irrigation of the soil through water taps array that can be positioned in the field or in a green house. The irrigation is controlled so as to accord the requirements of the crops and the soil as received from the field monitoring units. The controller establishes data acquisition, management of the data, emits warning signals, warns in case of irregularities, etc.; information from server 230 are optionally stored in database 220 and optionally communicated to remote user growers 250.

Reference is now made to FIG. 3 illustrating an automatic process 300 used by management system server 230 in accordance with a preferred embodiment of the present invention. Analyzed sampled data is gathered 310 from water & soil system controller 240 that; specific data pertaining to the sampled soil and crop is gathered 320 from the database; based on the gathered values, specific irrigation and fertilizing policy for current point in time is computed 330 for current soil and crop; server 230 also generate and communicate 340 signals for operating water & soil system controller 240.

Figure 4:
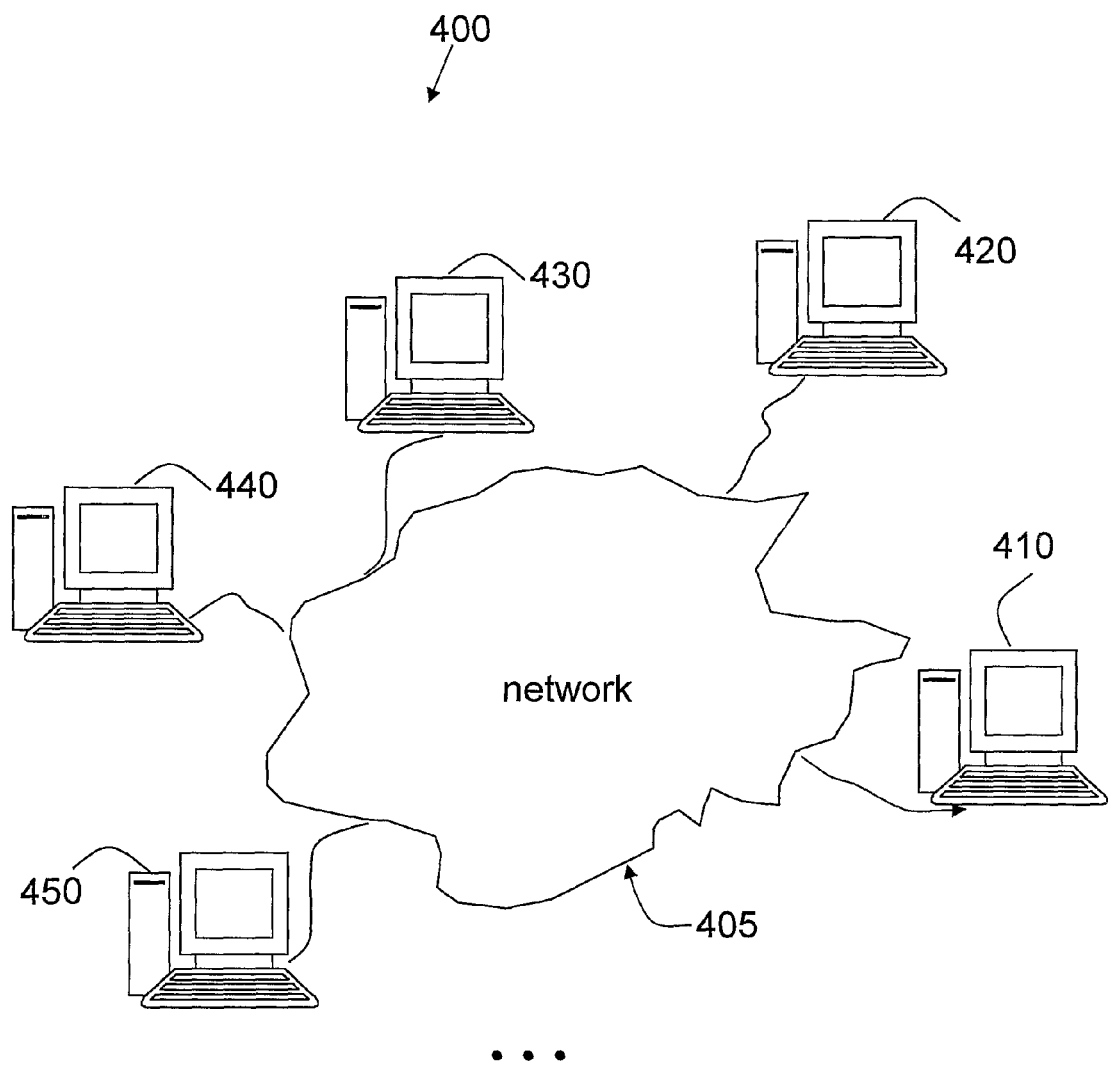
FIG. 4 illustrates overall water and fertilizer management system receiving and transmitting data from several growers.

Reference is now made to FIG. 4 illustrating overall water and fertilizer management system receiving and transmitting data from several growers 400. Several growers 410-450 in different countries can communicate with the system's database 220 and receive and transfer information through a net 405 such as an internet.

Based on the embodiment described herein, an experimental system was built and tried.

Figure 5:
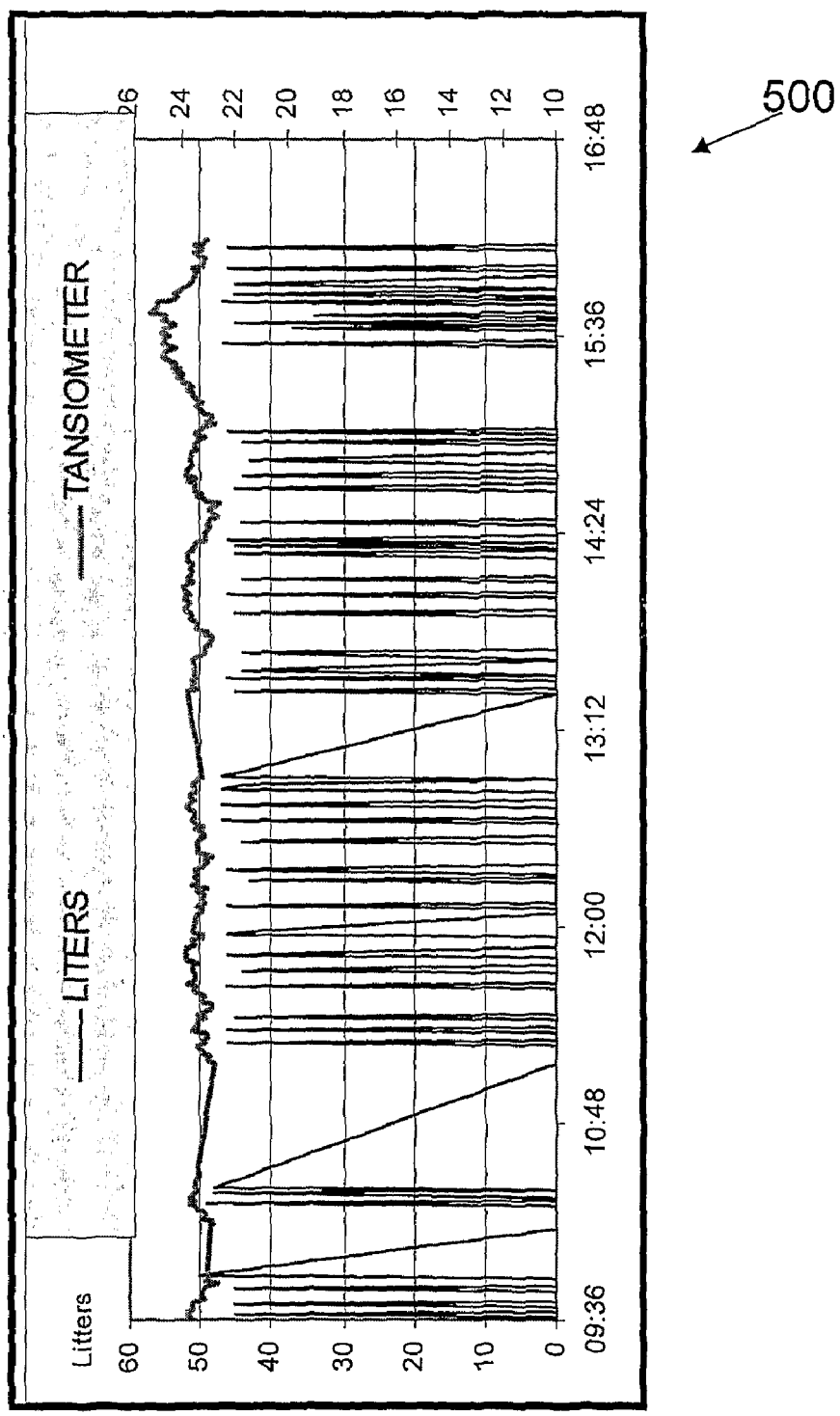
FIG. 5 illustrates a graph showing the resultant tensiometer values measured by a filed monitoring unit in a field managed by the water and fertilizer system of the present invention.

Reference is now made to FIG. 5 illustrating a graph showing the resultant tensiometer values measured by a filed monitoring unit in a field managed by the water and fertilizer system of the present invention. It can be seen that multiply small irrigation of water amounts keeps the level of the tensiometer between 20-25 mbars, relatively constant. This feature guaranties that water will be saved by giving the exact amounts that are demanded by the roots of the plants. The on-line information received from the vicinity of the plant's root, by the field monitoring unit provides all data from which the exact amounts of water and fertilizer are exerted.

Figure 6:
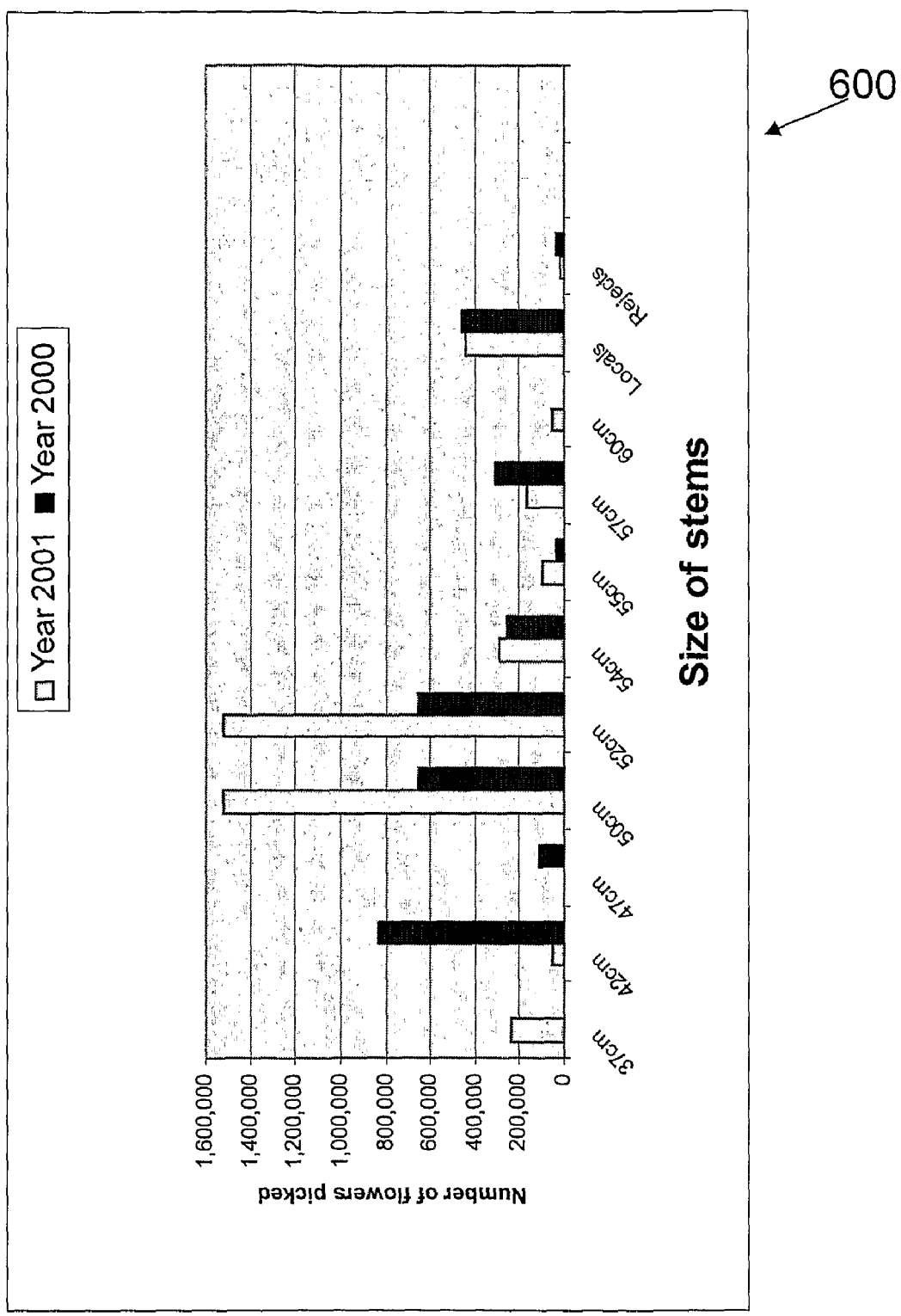
FIG. 6 illustrates a comparison between the size of stems of a plant before using the water and fertilizer management system of the present invention and after it has been experimentally used.

Reference is now made to FIG. 6 illustrating a comparison between the size of stems of a plant before using the water and fertilizer management system and after it has been experimentally used. Parameters indicating the quality of crops were examined in a certain field with a traditional irrigation system and after employing the water and fertilizer management system of the present invention. The height of the stems in flowers is a significant parameter as for the quality of the crop. It can be seen that the number of flowers having stem height of 50-52 cm is significantly higher than the number of flowers having the same height that were picked in the previous year, in which regular irrigation system was employed. Generally, with non regard to the height of the flower, the total number of flower picked in the year in which the new water and fertilizer management system of the present invention was employed was significantly higher than in the previous year.

It should be clear that the description of the embodiments and attached Figures set forth in this specification serves only for a better understanding of the invention, without limiting its scope as covered by the following Claims.

It should also be clear that a person skilled in the art, after reading the present specification can make adjustments or amendments to the attached Figures and above described embodiments that would still be covered by the following Claims.

The invention claimed is:

1. A method for managing a field water and fertilizer system, said method comprising:
   positioning at least one field monitoring unit in the field, wherein said at least one field monitoring unit is capable of sensing parameters related to conditions in the vicinity of root zone, wherein said at least one field monitoring unit comprises at least two sensors, wherein one of said two sensors is a tensiometer;
   transferring the parameters from said at least two sensors to a processor so as to establish a database;
   providing a controller capable of activating the water and fertilizing system in accordance to the parameters in the database; and
   wherein transferring the parameters from said at least two sensors to a processor so as to establish a database involves:
   presenting desired parameters' values for optimal growth of different crops as a model;
   comparing the parameters with the model; and
   establishing desired amount of water and fertilizing needed to set up the controller.

2. The method as claimed in claim 1, wherein one of said at least two sensors is a pH sensor.

3. The method as claimed in claim 1, wherein one of said at least two sensors is a nitrate sensor.

4. The method as claimed in claim 1, wherein one of said at least two sensors is an electrical conductivity sensor.

5. A method as claimed in claim 1 wherein data is transferred to the model from multiple users.

6. The method of claim 1, wherein the tensiometer is a mercury type.

7. The method of claim 1, wherein said controller is activating the system so as to maintain the level of the tensiometer between 20 and 25 mbars.

* * * * *